US008630458B2

(12) United States Patent
Oster et al.

(10) Patent No.: US 8,630,458 B2
(45) Date of Patent: Jan. 14, 2014

(54) USING CAMERA INPUT TO DETERMINE AXIS OF ROTATION AND NAVIGATION

(75) Inventors: David P. Oster, San Jose, CA (US); Julien C. Mercay, Belmont, CA (US)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 13/426,292

(22) Filed: Mar. 21, 2012

(65) Prior Publication Data

US 2013/0249894 A1  Sep. 26, 2013

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

| 7,271,795 | B2 | 9/2007 | Bradski | |
|---|---|---|---|---|
| 2008/0152192 | A1* | 6/2008 | Zhu et al. | 382/103 |
| 2009/0096790 | A1* | 4/2009 | Wiedemann et al. | 345/427 |
| 2010/0053219 | A1* | 3/2010 | Kornmann | 345/653 |

OTHER PUBLICATIONS

Thomas H. Kolbe, "Augmented Videos and Panoramas for Pedestrian Navigation," Proceedings of the 2nd Symposium on Location Based Services & TeleCartography 2004, Jan. 29, 2004.

* cited by examiner

*Primary Examiner* — Stephen R Koziol
*Assistant Examiner* — Delomia Gilliard
(74) *Attorney, Agent, or Firm* — Sterne, Kessler, Goldstein & Fox P.L.L.C.

(57) ABSTRACT

Systems, methods, and computer storage mediums are provided for navigating a virtual camera within a virtual three-dimensional environment using a mobile device. An exemplary method includes receiving, from at least one sensor on the mobile device, an indication that the mobile device has pivoted about a first rotation axis. A change in a user's position in relation to the mobile device is tracked as the mobile device is pivoted about the first rotation axis. A location of the first rotation axis is then determined based on the change in the user's position in relation to the mobile device. When the location of the first rotation axis is proximate to the mobile device, a first action to navigate within the three-dimensional environment is executed. When the location of the first rotation axis is proximate to the user, however, a second action to navigate within the three-dimensional environment is executed.

21 Claims, 7 Drawing Sheets

USING CAMERA INPUT TO DETERMINE AXIS OF ROTATION AND NAVIGATION

FIELD

The embodiments described herein generally relate to navigating within a virtual three-dimensional environment.

BACKGROUND

Many currently available mobile devices include motion sensors, such as an accelerometer, a compass, and a gyroscope, that may be used to navigate a virtual camera within a three-dimensional environment. The sensors indicate a change in the mobile device's position as the mobile device is moved about by a user. The sensors, however, are not able to track the user's position relative to the mobile device and use the change in the user's position relative to the mobile device in combination with the sensors to navigate the virtual camera.

BRIEF SUMMARY

The embodiments described herein include systems, methods, and computer storage mediums for navigating a virtual camera within a virtual three-dimensional environment using a mobile device, where the mobile device displays an image plane of the virtual three-dimensional environment from the perspective of the virtual camera. An exemplary method includes receiving, from at least one sensor on the mobile device, an indication that the mobile device has pivoted about a first rotation axis. The first rotation axis is parallel to a plane encompassing the mobile device's display screen. A change in a user's position in relation to the mobile device is tracked as the mobile device is pivoted about the first rotation axis. The change in the user's position is determined from a plurality of images of the user captured by the mobile device's front-facing camera. A location of the first rotation axis is then determined based on the change in the user's position in relation to the mobile device. When the location of the first rotation axis is proximate to the mobile device, a first action to navigate within the three-dimensional environment is executed. When the location of the first rotation axis is proximate to the user, however, a second action to navigate within the three-dimensional environment is executed.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Mobile devices configured according to the embodiments described herein may be used to navigate a virtual camera within a three-dimensional environment that is displayed on the mobile device. The virtual camera is navigated based on data received from the motion sensors in the mobile device and images streamed from the mobile device's front-facing camera as the mobile device is moved about by a user. The data from the motion sensors is used in conjunction with changes in the user's position relative to the mobile device to determine a navigation action for the virtual camera. The changes in the user's position, relative to the mobile device, are determined by tracking a difference in where the user appears in the images streamed by the mobile device's front-facing camera.

In the following detailed description, references to "one embodiment," "an embodiment," "an example embodiment," etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description makes reference to the term "proximate to." This term is used to describe a rotation axis being in approximately the same location as an object. The rotation axis is proximate to the object if the rotation axis intersects at least a portion of the object. For example, if an object is rotating about an axis of rotation, the axis of rotation is proximate to the object.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

The following detailed description is divided into sections. The first section describes exemplary motions and navigations that may be utilized by the embodiments described herein. The second and third sections describe example system and method embodiments, respectively, that may be used to navigate a virtual camera within a virtual three-dimensional environment. The fourth section describes an example computer system that may be used to implement the embodiments described herein.

Example Motions and Navigations

Figure 1A:
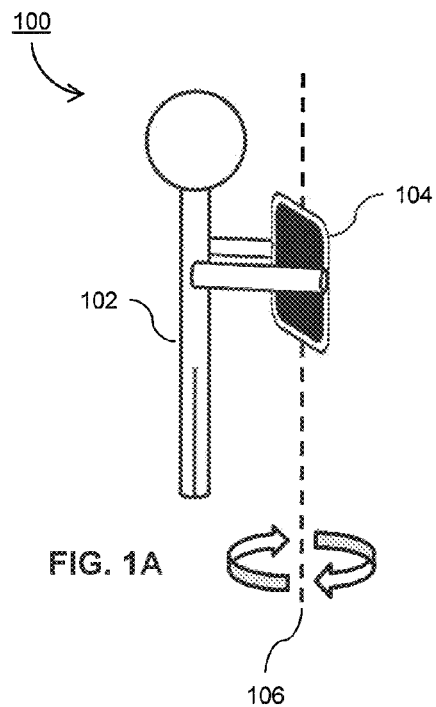
FIG. 1A is a diagram that illustrates a motion of a mobile device that may be used to navigate a virtual camera within a virtual three-dimensional environment.

FIG. 1A is a diagram 100 that illustrates a motion of a mobile device that may be used to navigate a virtual camera within a virtual three-dimensional environment. Diagram 100 includes user 102, mobile device 104, and rotation axis 106. Diagram 100 is performed by user 102 pivoting mobile device 104 about a first rotation axis 106. As user 102 pivots mobile device 104, mobile device 104 is configured to determine the location of rotation axis 106. The location of rotation axis 106 is determined by using data received from sensors on mobile device 104 and images streamed from mobile device 104's camera(s) that can capture an image of the user when the user faces the device's display screen. For example, the user-facing camera may be a "front-facing camera" comprising one or more imaging sensors positioned on or in mobile device 104 at a position so that the user is in the camera's field of view when the user faces the device's display. Although a front-facing camera is discussed here, in some implementations the imaging sensor(s) may face in another direction, with optical elements (e.g., mirrors) used so that the sensor(s) can capture images of the user. In this example, rotation axis 106 is located proximate to mobile device 104, i.e., the rotation axis is closer to the mobile device than to the user.

Figure 1B:
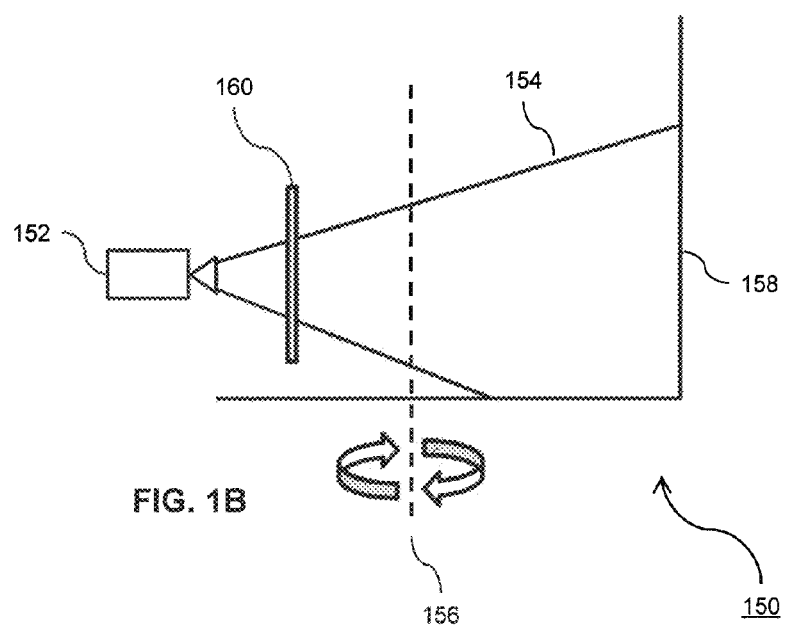
FIGS. 1B and 1C are diagrams that illustrate a navigation of a virtual camera within the three-dimensional environment where the navigation is based on the diagram in FIG. 1A.
Figure 1C:
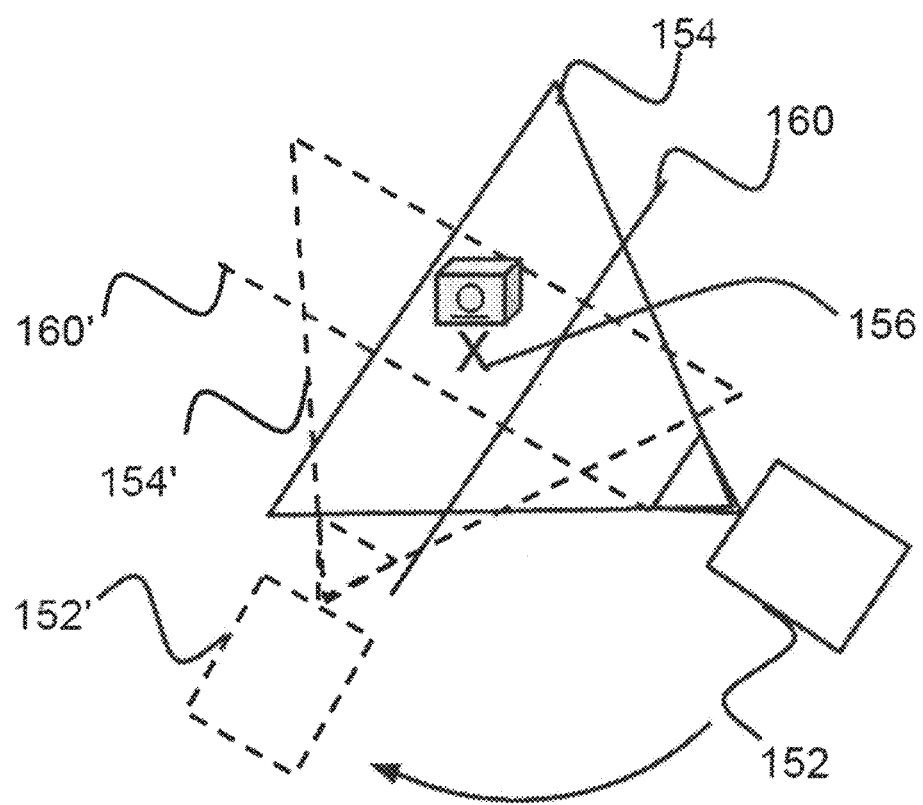

FIG. 1B is a diagram 150 that illustrates a navigation of a virtual camera within the three-dimensional environment where the navigation occurs in response to the rotation in diagram 100 in FIG. 1A. FIG. 1B shows navigation of the virtual camera from the side, while FIG. 1C shows a view looking along rotation axis 156. Diagram 150 includes virtual camera 152, field-of-view 154, rotation axis 156, three-dimensional environment 158, and image plane 160. Image plane 160 is displayed on mobile device 104's display. Image plane 160 captures three-dimensional environment 158 from the perspective of virtual camera 152 based on virtual camera 152's field-of-view 154. As user 102 performs motion 100, a first navigation action is executed so that virtual camera 152 is navigated about three-dimensional environment 158 by pivoting virtual camera 152 about rotation axis 156. Here, rotation axis 156 is located at a distance between image plane 160 and the scene represented in three-dimensional environment 158.

As shown in FIG. 1C, virtual camera 152 rotates about axis 156 from a first position having field of view 154 and corresponding image plane 160 to a second position 152' having field of view 154' and corresponding image plane 160'. As shown in this example, an object O at or near rotation axis 156 remains in view after the rotation while other features of the three-dimensional environment (not shown) may be visible in the foreground and/or background due to rotation. Object O could, of course, be any feature in the three-dimensional environment including (but not limited to) terrain, a building, etc.

Figure 2A:
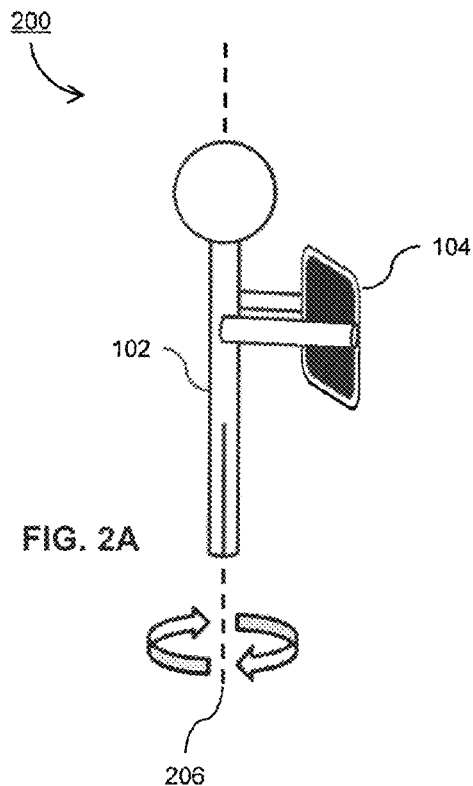
FIG. 2A is a diagram that illustrates a motion of a mobile device that may be used to navigate a virtual camera within a virtual three-dimensional environment.

FIG. 2A is a diagram 200 that illustrates a motion of a mobile device that may be used to navigate a virtual camera within a virtual three-dimensional environment. Like diagram 100, diagram 200 includes user 102 and mobile device 104. Diagram 200, however, depicts a first rotation axis 206 that is closer to the user than to mobile device 104 instead of rotation axis 106 (which was closer to device 104 than to the user in FIG. 1A). In response, mobile device 104 selects a different navigation action.

Figure 2B:
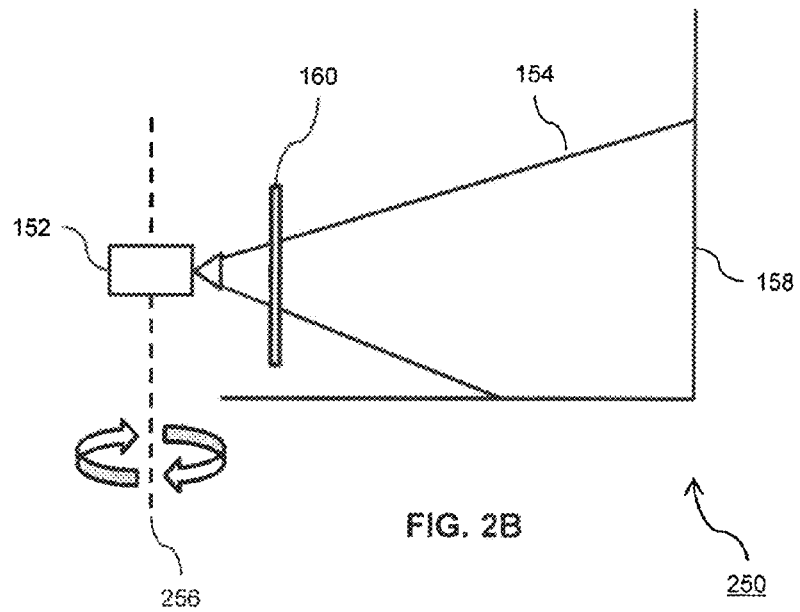
FIGS. 2B and 2C are diagrams that illustrate a navigation of a virtual camera within the three-dimensional environment where the navigation is based on the diagram in FIG. 2A.
Figure 2C:
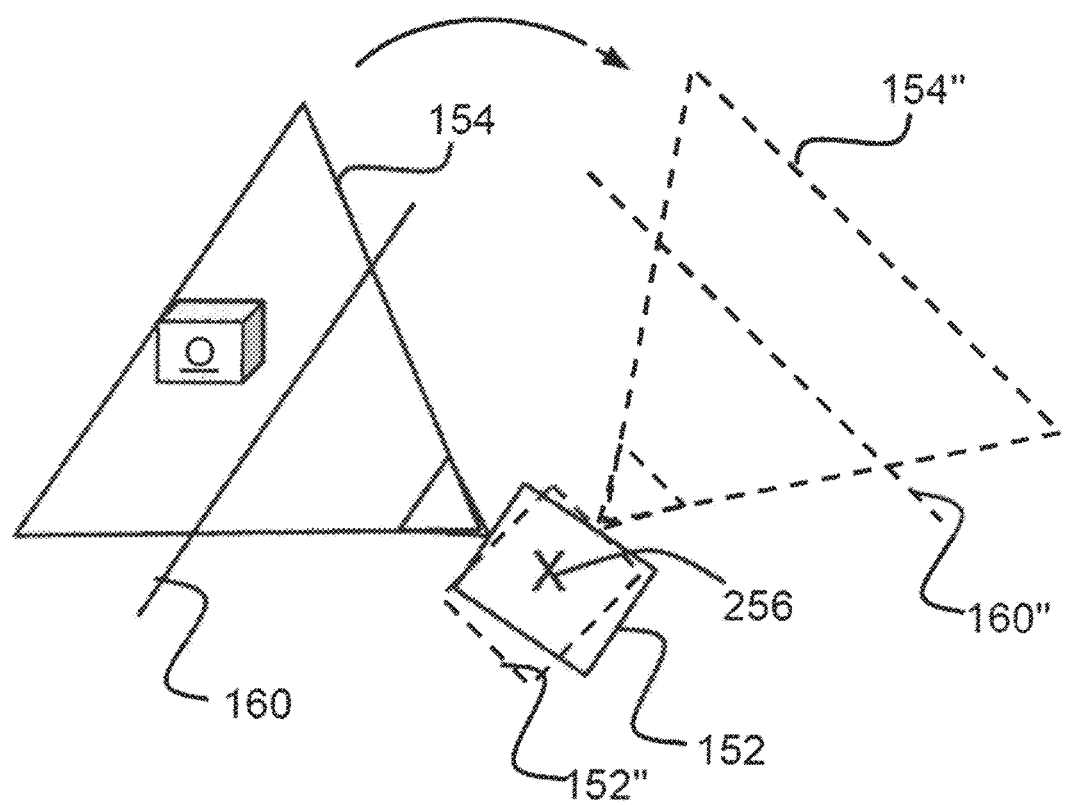

FIG. 2B is a diagram 250 that illustrates an example of navigation of a virtual camera within the three-dimensional environment in response to the rotation shown in FIG. 2A. FIG. 2B shows the navigation from the side, while FIG. 2C shows a view looking along the rotation axis (256). Like diagram 150, diagram 250 includes virtual camera 152, field-of-view 154, three-dimensional environment 158, and image plane 160. Diagram 250, however, includes rotation axis 256 instead of rotation axis 156. As user 102 performs the rotation in diagram 200, virtual camera 152 is navigated about three-dimensional environment 158 by pivoting virtual camera 152 about rotation axis 256. Here, rotation axis 256 is proximate to virtual camera 152.

As shown in FIG. 2C, virtual camera 152 rotates about axis 256 from a first position 152 having field of view 154 and corresponding image plane 160 to a second position 152" having a field of view 154" and corresponding image plane 160". As shown in this example, an object O that was in field of view 154 is no longer visible after the rotation about axis 256. Instead, other objects (not shown) in the portion of the three-dimensional environment corresponding to field of view 154" may be visible. Thus, by comparing the examples of FIGS. 1C and 2C, it can be seen that the different navigation actions can allow a user to rotate the camera in place in the three-dimensional environment (FIG. 2C) or rotate about an axis to "go around" a portion of the three-dimensional environment (FIG. 1C) (e.g., to see different sides of object O).

Embodiments can distinguish between the motions illustrated in diagrams 100 and 200 by using an image sensor to track the position of the user in relation to the mobile device. By distinguishing from the two motions, embodiments can trigger a first action—such as the navigation illustrated in diagram 150—in response to the motion illustrated in diagram 100 and a second action—such as the navigation illustrated in diagram 250—in response to the motion illustrated in diagram 200. For instance, the motion shown in diagram 100 will be identifiable at least in part by analyzing imagery to the user and determining that the user's position with respect to the front-facing camera has changed. On the other hand, in the motion shown in diagram 200, the user (by and large) moves with device 104 and accordingly the user's position with respect to the front-facing camera remains generally unchanged.

Diagrams 100, 150, 200, and 250 are provided as examples and are not intended to limit the embodiments described herein.

Example System Embodiments

Figure 3:
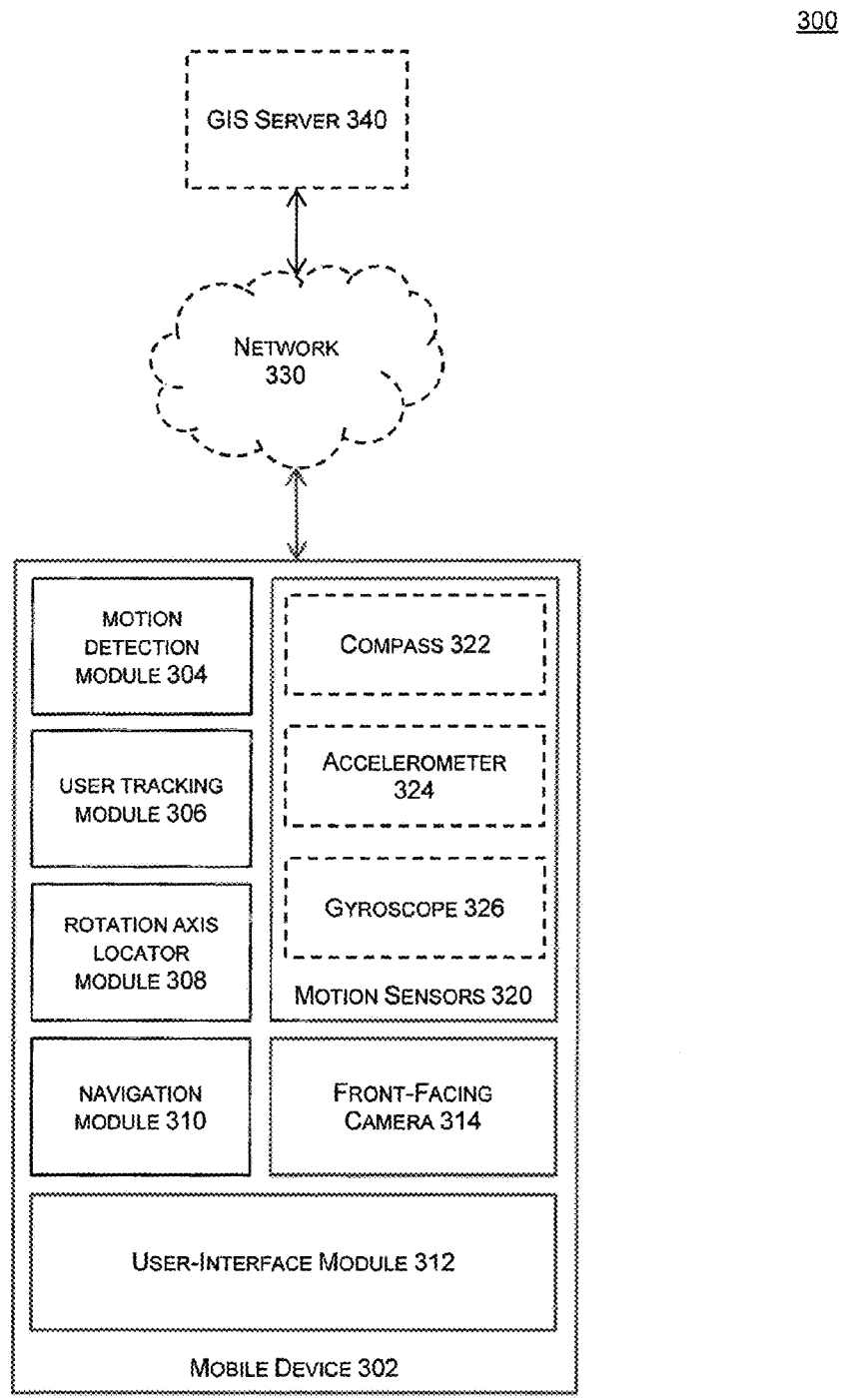
FIG. 3 illustrates an example system environment that may be used to navigate a virtual camera within a virtual three-dimensional environment using a mobile device.

FIG. 3 illustrates an example system environment that may be used to navigate a virtual camera within a virtual three-dimensional environment using a mobile device. System 300 includes mobile device 302. In some embodiments, system 300 may also include network 330 and GIS server 340. Mobile device 302 includes motion detection module 304, user tracking module 306, rotation axis locator module 308, navigation module 310, and user-interface module 312, front-facing camera 314, and motion sensors 320. Motion sensors 320 may include, for example, compass 322, accelerometer 324, or gyroscope 326.

Network 330 can include any network or combination of networks that can carry data communication. These networks can include, for example, a local area network (LAN) or a wide area network (WAN), such as the Internet. LAN and WAN networks can include any combination of wired (e.g., Ethernet) or wireless (e.g., Wi-Fi, 3G, or 4G) network components.

GIS server 340 can include any geographic information system capable of serving geo-referenced data that includes a virtual three-dimensional environment. The geo-referenced data can include, for example, maps, satellite images, information layers, terrain data, three-dimensional globes, and any other type of geographic data. GIS server 340 can be made up of a single server system or a distributed network of servers.

A. Mobile Device

Mobile device 302 can be implemented on any computing device. Mobile device 302 can include, for example, a mobile computing device (e.g. a mobile phone, a smart phone, a personal digital assistant (PDA), a navigation device, a tablet, or other mobile computing devices). Computing devices may also include, but are not limited to, a central processing unit, an application-specific integrated circuit, a computer, workstation, distributed computing system, computer cluster, embedded system, stand-alone electronic device, networked device, rack server, set-top box, or other type of computer system having at least one processor and memory. A computing process performed by a clustered computing environment or server farm may be carried out across multiple processors located at the same or different locations. Hardware can include, but is not limited to, a processor, memory and user interface display. In some embodiments, mobile device 302 also includes computing devices that are capable of communicating with a GIS and rendering a virtual three-dimensional environment received from the GIS.

Mobile device 302 is configured to display an image plane of a virtual three-dimensional environment. The image plane is similar to a photographic image of a physical space captured by a camera. The image plane is captured from the perspective of a virtual camera as the virtual camera is navigated around the three-dimensional environment. The image plane is displayed on the mobile device by using, for example, user-interface module 312.

The virtual three-dimensional environment displayed by mobile device 302 may be provided by, for example, GIS server 340 or another computer process or system configured to provide a three-dimensional environment such as, for example, three-dimensional computer games or virtual simulators.

1. Motion Detection Module

Mobile device 302 includes motion detection module 304. Motion detection module 304 is configured to receive an indication that mobile device 302 has pivoted about a rotation axis. The rotation axis is an axis parallel to a plane encompassing the mobile device 302's display screen. For example, if a user holds mobile device 302 such that its display screen is substantially parallel with the direction of the force of gravity, the rotation axis is substantially parallel with the direction of the force of gravity.

Motions sensors 320 may be utilized to determine whether mobile device 302 has pivoted about the rotation axis. Motion sensors 320 may include, for example, compass 322, accelerometer 324, or gyroscope 326. In some embodiments, compass 322 is used to determine whether mobile device 302 is pivoted about the rotation axis. Compass 322 is configured to determine mobile device 302's orientation direction based on a number of degrees relative to magnetic north. The number of degrees relative to magnetic north will change as mobile device 302 is pivoted about the rotation axis. The change in the number of degrees can be used to determine whether mobile device 302 is pivoting about the rotation axis and the rate at which mobile device 302 is pivoted.

In some embodiments, accelerometer 324 is used to determine whether mobile device 302 is pivoted about the rotation axis. Accelerometer 324 is configured to determine the proper acceleration (e.g., gravitational force) of mobile device 302. As mobile device 302 is held by a user at certain angles relative to the force of gravity, accelerometer 324 will determine the direction (and possibly the magnitude) of the gravitational force acting upon mobile device 302. The change of the g-force acting on mobile device 302 can be used to determine whether mobile device 302 is pivoting about the rotation axis.

In some embodiments, gyroscope 326 is used to determine whether mobile device 302 is pivoted about the rotation axis. Gyroscope 326 is configured to determine mobile device 302's movement in three directions. As mobile device 302 is pivoted by a user, gyroscope 326 indicates mobile device 302's rate and direction of movement. The direction of movement can be used to determine whether mobile device 302 is pivoted about the rotation axis.

In some embodiments, a combination of compass 322 and accelerometer 324 are used to determine whether mobile device 302 is pivoted about the rotation axis. For example, as the user pivots mobile device 302 about the rotation axis, compass 322 will indicate the change in mobile device 302's orientation direction relative to magnetic north and accelerometer 324 will indicate the change in the gravitational force acting on mobile device 302. A combination of this data may then be used to determine whether mobile device 302 is pivoted about the rotation axis and the rate at which mobile device 302 is pivoted.

2. User Tracking Module

Mobile device 302 also includes user tracking module 306. User tracking module 306 is configured to track a change in a user's position in relation to mobile device 302 as mobile device 302 is pivoted about the rotation axis. The change in the user's position is determined from a plurality of images of the user captured by front-facing camera 314. For example, as mobile device 302 is pivoted about the rotation axis, front-facing camera 314 will stream a plurality of images. User tracking module 306 will then analyze the images to determine a change in the user's position between the images.

In some embodiments, user tracking module 306 is also configured to determine a change in the position of the user based on the position of the user's face in the plurality of images steamed by front-facing camera 314. For example, as mobile device 302 is pivoted about the rotation axis, user tracking module 306 will detect a position of the user's face in each image and will determine the extent of the change in the position of the user's face relative to mobile device 302. In some embodiments, user tracking module 306 will determine the change based on the position of the user's eyes in relation to mobile device 302. The act of tracking the user can include some filtering or thresholding to account for the fact that as the user remains relatively stationary with respect to the mobile device. A certain amount of motion in the image may nonetheless occur.

3. Rotation Axis Locator Module

Mobile device 302 also includes rotation axis locator module 308. Rotation axis locator module 308 is configured to determine a location of the rotation axis based on the extent of the change in the user's position in relation to mobile device 302. For example, if the user's position relative mobile device 302 changes substantially as mobile device 302 is pivoted about the rotation axis, rotation axis location module 308 will determine the location of the rotation axis to be proximate to mobile device 302. If the user's position relative to mobile device 302 does not change substantially as mobile device 302 is pivoted about the rotation axis, rotation axis locator module 308 will determine the location of the rotation axis to be proximate to the user.

In some embodiments, the location of the rotation axis may be determined to be somewhere between the user and mobile device 302. If the rotation axis is closer to the user than mobile device 302, rotation axis locator module 308 will determine the rotation axis to be located proximate to the user. If the rotation axis is closer to mobile device 302 than the user, rotation axis locator module 308 will determine the rotation axis to be located proximate to mobile device 302.

4. Navigation Module

Mobile device 302 also includes navigation module 310. Navigation module 310 is configured to execute a first action when the location of the first rotation axis is proximate to mobile device 302. Navigation module 310 is also configured to execute a second action when the location of the rotation axis is proximate to the user. The first and second actions both navigate the virtual camera within the three-dimensional environment but in different ways. For example, in some embodiments, the first action pivots the virtual camera about a rotation axis that is located at a distance away from the virtual camera. The location of the rotation axis may be, for example, between the image plane and an object represented in the three-dimensional environment. The second action, however, pivots the virtual camera about a rotation axis proximate to the virtual camera in the three-dimensional environment.

In some embodiments, the velocity at which the virtual camera is pivoted about its rotation axis in the three-dimensional environment corresponds to a velocity by which mobile device 302 is pivoted about its rotation axis. For example, as mobile device 302 is pivoted about its rotation axis, motion detection module 304 may track the rate at which mobile device 302 is pivoted. Mobile device 302's pivot rate may be translated into a pivot velocity that may be used to determine the velocity at which the virtual camera is pivoted. The velocity at which the virtual camera is pivoted may be scaled based on, for example, a zoom level used to view the three-dimensional environment or a user preference.

Various aspects of embodiments described herein can be implemented by software, firmware, hardware, or a combination thereof. The embodiments, or portions thereof, can also be implemented as computer-readable code. The embodiment in system 300 is not intended to be limiting in any way.

Example Method Embodiments

Figure 4:
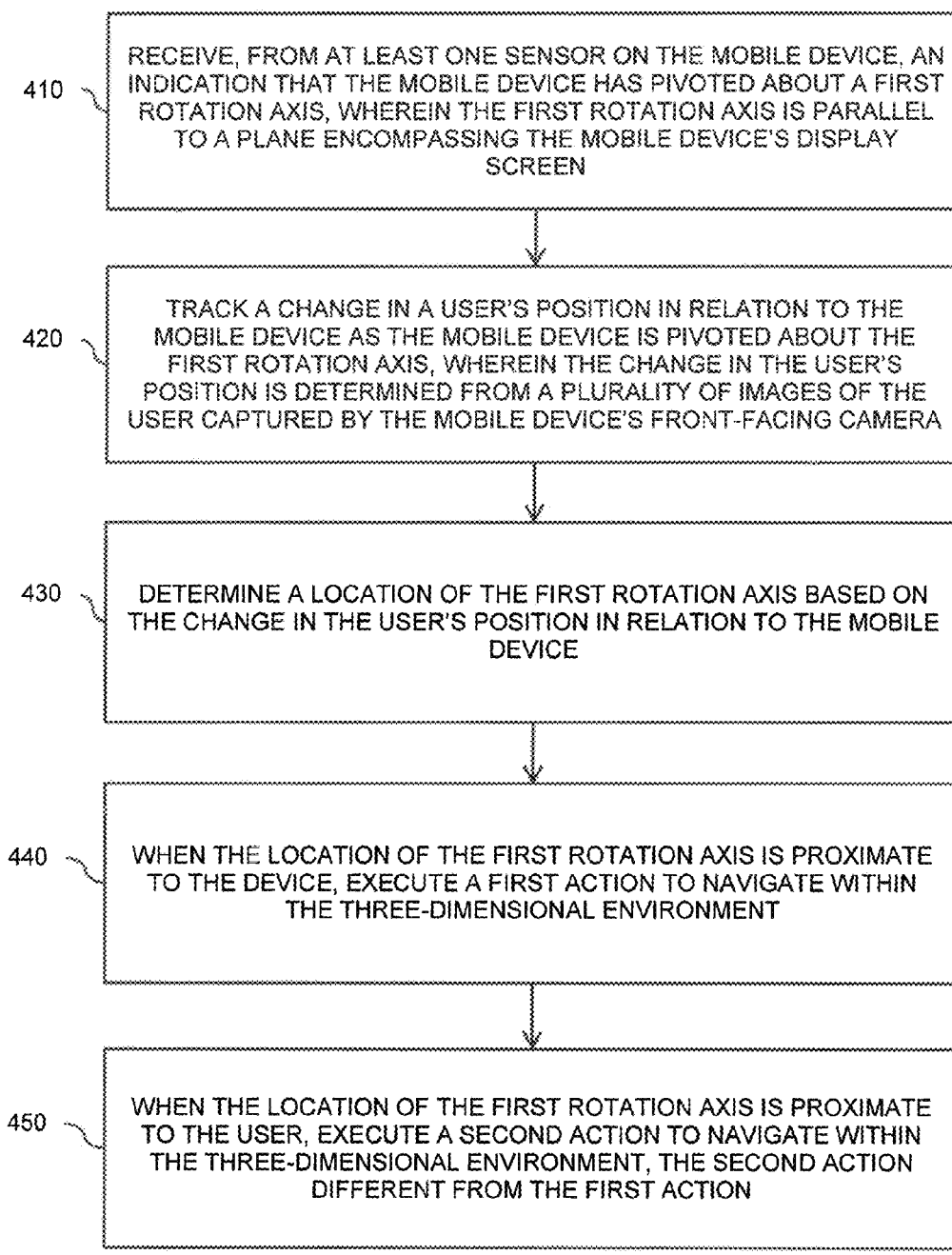
FIG. 4 is a flowchart illustrating an exemplary method that may be used to navigate a virtual camera within a virtual three-dimensional environment using a mobile device.

FIG. 4 is a flowchart illustrating, an exemplary method 400 that may be used to navigate a virtual camera within a virtual three-dimensional environment using a mobile device. The mobile device is configured to display an image plane of the environment from the perspective of the virtual camera. While method 400 is described with respect to an embodiment, method 400 is not meant to be limiting and may be used in other applications. Additionally, method 400 may be carried out by, for example, system 300.

Method 400 receives, from at least one sensor on the mobile device, an indication that the mobile device has pivoted about a first rotation axis (stage 410). The first rotation axis is parallel to a plane encompassing the mobile device's display screen. The first rotation axis may also be positioned along the display's y-axis. Whether the mobile device has pivoted about the first rotation axis may be determined by using motion sensors such as, for example, a digital compass, a digital accelerometer, or a digital gyroscope. Stage 410 may be carried out by, for example, motion detection module 304 embodied in system 300.

Method 400 also tracks a change in a user's position in relation to the mobile device as the mobile device is pivoted about the first rotation axis (stage 420). The change in the user's position is determined from a plurality of images of the user captured by the mobile device's front-facing camera. The plurality of images may be steamed directly from the front-facing camera and are not required to be stored on the mobile device. The change in the user's position may be determined by, for example, tacking the position of the user's facial features (e.g., eyes) relative to the mobile device. Stage 420 may be carried out by, for example, user tracking module 306 embodied in system 300.

Method 400 then determines a location of the first rotation axis based on the change in the user's position in relation to the mobile device (stage 430). If the user's position changes significantly between the plurality of images, the location of the rotation axis will be determined to be located proximate to the device. If the user's position changes insignificantly between the plurality of images, the location of the rotation axis will be determined to be located proximate to the user. Stage 430 may be carried out by, for example, rotation axis locator module 308 embodied in system 300.

When the location of the first rotation axis is proximate to the mobile device, method 400 executes a first action to navigate within the three-dimensional environment (stage 440). The first action may include, for example, pivoting the virtual camera in the three-dimensional environment about a second rotation axis that is located between the virtual camera and an object represented in the three-dimensional environment. Stage 440 may be carried out by, for example, navigation module 310 embodied in system 300.

When the location of the first rotation axis is proximate to the user, however, method 400 executes a second action to navigate within the three-dimensional environment (stage 450). The second action may also include, for example, pivoting the virtual camera in the three-dimensional environment about a second rotation axis, but instead of the second rotation axis being located between the virtual camera and an object represented in the three-dimensional environment, the second rotation axis is located proximate to the virtual camera. Stage 450 may be carried out by, for example, navigation module 310 embodied in system 300.

Example Computer System

Figure 5:
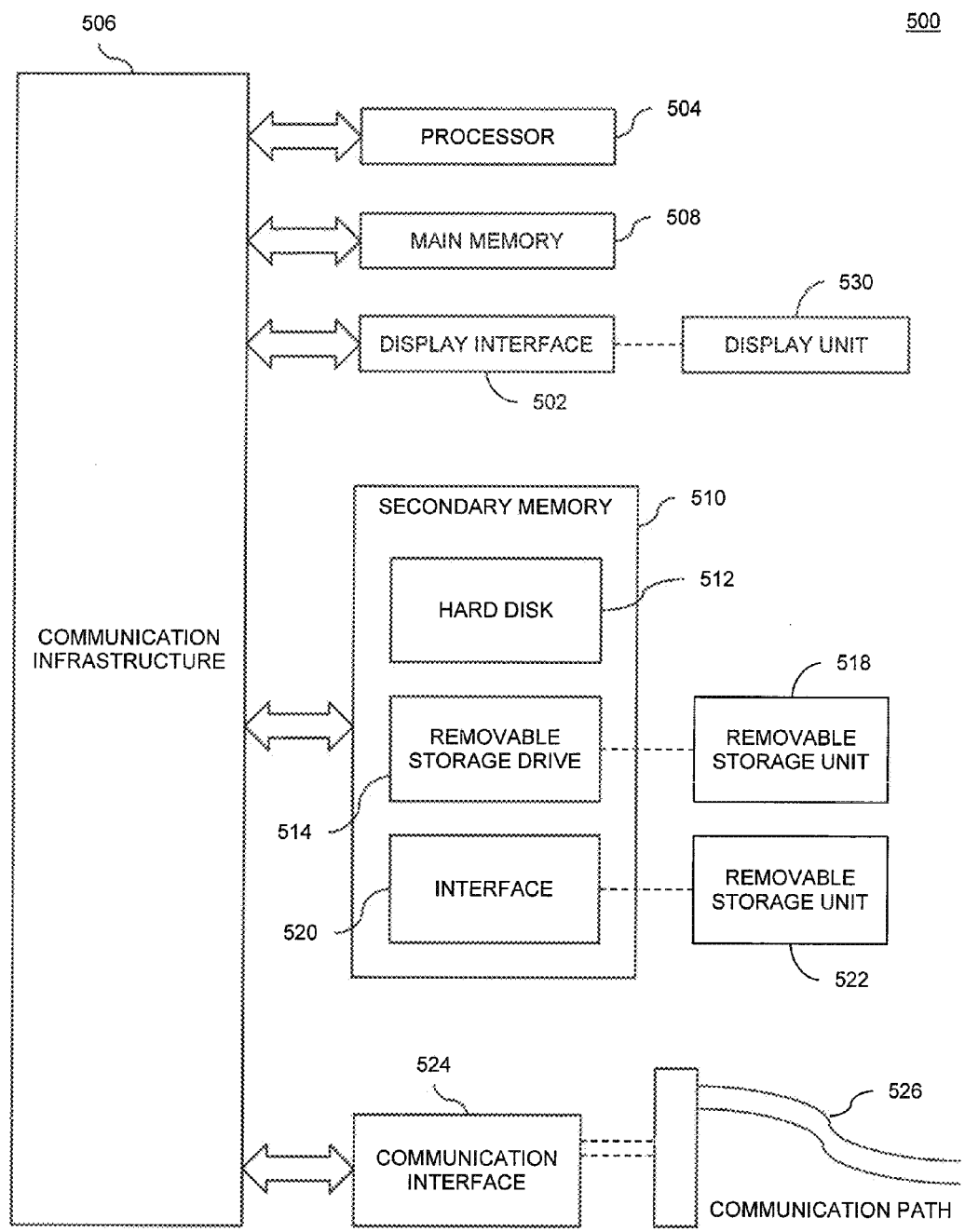
FIG. 5 illustrates an example computer in which the embodiments described herein, or portions thereof, may be implemented as computer-readable code.

FIG. 5 illustrates an example computer 500 in which the embodiments described herein, or portions thereof, may be implemented as computer-readable code. For example, motion detection module 304, user tracking module 306, rotation axis locator module 308, and navigation module 310 may be implemented in one or more computer systems 500 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme. Computer system 500 may also include display interface 502 and display unit 530.

Computer system 500 also includes a main memory 508, for example, random access memory (RAM), and may also include a secondary memory 510. Secondary memory 510 may include, for example, a hard disk drive 512, and removable storage drive 514. Removable storage drive 514 may include a floppy disk drive, a magnetic tape drive, an optical disk drive, a flash memory drive, or the like. The removable storage drive 514 reads from and/or writes to a removable storage unit 518 in a well-known manner. Removable storage unit 518 may include a floppy disk, magnetic tape, optical disk, flash memory drive, etc. which is read by and written to by removable storage drive 514. As will be appreciated by persons skilled in the relevant art, removable storage unit 518 includes a computer readable storage medium having stored thereon computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 518, removable storage unit 522, and a hard disk installed in hard disk drive 512. Computer storage medium and computer readable storage medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the embodiments described herein. In particular, the computer programs, when executed, enable processor device 504 to implement the processes of the embodiments, such as the stages in the methods illustrated by flowchart 400 of FIG. 4, discussed above. Accordingly, such computer programs represent controllers of computer system 500. Where an embodiment is implemented using software, the software may be stored in a computer storage medium and loaded into computer system 500 using removable storage drive 514, interface 520, and hard disk drive 512, or communications interface 524.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for navigating a virtual camera within a virtual three-dimensional environment using a mobile device, the mobile device displaying an image plane of the virtual three-dimensional environment from the perspective of the virtual camera, the method comprising:

receiving, from at least one sensor on the mobile device, an indication that the mobile device has pivoted about a first rotation axis, wherein the first rotation axis is parallel to a plane encompassing a display screen of the mobile device;

capturing a plurality of images of the user while the user faces the display screen of the mobile device;

tracking a change in a user's position in relation to the mobile device as the mobile device is pivoted about the first rotation axis, wherein the change in the user's position is determined from the plurality of images of the user;

determining a location of the first rotation axis based on the change in the user's position in relation to the mobile device;

determining whether the first rotation axis is closer to the user than the mobile device; and executing one of a plurality of different actions to navigate within the three-dimensional environment, a first action executed if the first rotation axis is closer to the user and a second action executed if the first rotation axis is closer to the mobile device.

2. The computer-implemented method of claim 1, wherein the first action includes pivoting the virtual camera about a second rotation axis, the second rotation axis parallel to the image plane, wherein the second rotation axis is located between the virtual camera and an object at a distance away from the virtual camera, the second rotation axis located closer to the object than the virtual camera.

3. The computer-implemented method of claim 2, wherein the second action includes pivoting the virtual camera about the second rotation axis, wherein the location of the second rotation axis is closer to the virtual camera than the object.

4. The computer-implemented method of claim 1, wherein tracking a change in the user's position includes determining the change in the position of the user's eyes from the plurality of images.

5. The computer-implemented method of claim 1, wherein the at least one sensor on the mobile device includes an accelerometer and a compass.

6. The computer-implemented method of claim 5, further comprising:
prior to receiving an indication that the mobile device has pivoted about the first rotation axis:
tracking, by use of the accelerometer, a change in the gravitational force acting on the mobile device;
tracking, by use of the compass, a change in the position of magnetic north in relation to the mobile device;
determining whether the mobile device has pivoted about the first rotation axis based on the change in the gravitational force and the change in the position of magnetic north.

7. The computer-implemented method of claim 1, wherein the at least one sensor on the mobile device includes a gyroscope.

8. The computer-implemented method of claim 1, wherein a velocity by which the virtual camera is pivoted about the second rotation axis corresponds a velocity which the mobile device is pivoted about the first rotation axis.

9. A mobile device configured to navigate a virtual camera within a virtual three-dimensional environment using a mobile device, the mobile computing device displaying an image plane of the virtual three-dimensional environment from the perspective of the virtual camera, comprising:
a motion detection module configured to receive, from at least one sensor on the mobile computing device, an indication that the mobile device has pivoted about a first rotation axis, wherein the first rotation axis is parallel to a plane encompassing the mobile device's display screen;
a user tracking module configured to track a change in a user's position in relation to the mobile device as the mobile computing device is pivoted about the first rotation axis, wherein the change in the user's position is determined from a plurality of images of the user captured by the mobile device's front-facing camera;
a rotation axis locator module configured to determining a location of the first rotation axis based on the change in the user's position in relation to the mobile device;
a navigation module configured to:
execute a first action when the location of the first rotation axis is proximate to the mobile device, wherein the first action navigates the virtual camera within the three-dimensional environment; and
execute a second action when the location of the first rotation axis is proximate to the user, wherein the second action navigates the virtual camera within the three-dimensional environment, the second action different from the first action;
at least one memory unit configured to store at least one of the motion detection module, the user tracking module, the rotation axis locator module, or the navigation module; and
at least one computer processor configured to execute at least one of the motion detection module, the user tracking module, the rotation axis locator module, or the navigation module.

10. The mobile device of claim 9, wherein the first action includes pivoting the virtual camera about a second rotation axis, the second rotation axis parallel to the image plane, wherein the second rotation axis is located between the virtual camera and an object at a distance away from the virtual camera, the second rotation axis located closer to the object than the virtual camera.

11. The mobile device of claim 10, wherein the second action includes pivoting the virtual camera about the second rotation axis, wherein the location of the second rotation axis is closer to the virtual camera than the object.

12. The mobile device of claim 9, wherein the user tracking module is further configured to determine the change in the position of the user's eyes from the plurality of images.

13. The mobile device of claim 9, wherein the at least one sensor on the mobile computing device includes an accelerometer and a compass.

14. The mobile device of claim 13, wherein the motion detection module is further configured to:
prior to receiving an indication that the mobile device has pivoted about the first rotation axis:
track, by use of the accelerometer, a change in the gravitational force acting on the mobile device;
track, by use of the compass, a change in the position of magnetic north in relation to the mobile device;
determine whether the mobile device has pivoted about the first rotation axis based on the change in the position of gravity and the change in the position of magnetic north.

15. The mobile device of claim 9, wherein the at least one sensor on the mobile device includes a gyroscope.

16. The mobile device of claim 9, wherein a velocity by which the virtual camera is pivoted about the second rotation axis corresponds a velocity by which the mobile device is pivoted about the first rotation axis.

17. A non-transitory computer-readable storage medium having instructions encoded thereon that, when executed by a mobile device, causes the mobile device to perform operations comprising:
receiving, from at least one sensor on the mobile device, an indication that the mobile device has pivoted about a first rotation axis, wherein the first rotation axis is parallel to a plane encompassing the mobile device's display screen;
tracking a change in a user's position in relation to the mobile device as the mobile device is pivoted about the first rotation axis, wherein the change in the user's position is determined from a plurality of images of the user captured by the mobile device's front-facing camera;
determining a location of the first rotation axis based on the change in the user's position in relation to the mobile device;

when the location of the first rotation axis is proximate to the mobile device, executing a first action to navigate within the three-dimensional environment; and when the location of the first rotation axis is proximate to the user, executing a second action to navigate within the three-dimensional environment, the second action different from the first action.

18. A mobile device, comprising:

at least one computer processor;

a display interfaced to the at least one computer processor;

at least one sensing device interfaced to the at least one computer processor;

imaging hardware interfaced to the at least one computer processor and configured to capture imagery of a space in front of the display; and a housing containing the at least one computer processor, the display, the at least one sensing device, and the imaging hardware, the at least one computer processor configured to:
 identify a rotation of the mobile device about a first rotation axis using at least data generated by the sensing device; and
 track a change in a position of a user of the mobile device as the mobile device is rotated using data generated by the imaging hardware;
 in response to the rotation and change in the position of the user, select one of a plurality of different navigation actions that change a view of a virtual camera in a three-dimensional environment shown on the display, a first navigation action selected if the first rotation axis is closer to the user than the mobile device and a second navigation selected if the rotation axis is closer to the mobile device than the user.

19. The mobile device of claim 18, wherein the first navigation action includes pivoting the virtual camera about a second rotation axis, the second rotation axis parallel to the image plane captured by the virtual camera, wherein the second rotation axis is located between the virtual camera and an object at a distance away from the virtual camera, the second rotation axis located closer to the object than the virtual camera.

20. The mobile device of claim 19, wherein the second navigation action includes pivoting the virtual camera about the second rotation axis, wherein the location of the second rotation axis is closer to the virtual camera than the object.

21. The mobile device of claim 18, wherein the imaging hardware is configured to generate data indicating a change in the position of the user's eyes in relation to the display of the mobile device.

* * * * *

UNITED STATES PATENT AND TRADEMARK OFFICE
CERTIFICATE OF CORRECTION

| | |
|---|---|
| PATENT NO. | : 8,630,458 B2 |
| APPLICATION NO. | : 13/426292 |
| DATED | : January 14, 2014 |
| INVENTOR(S) | : Oster et al. |

Page 1 of 1

It is certified that error appears in the above-identified patent and that said Letters Patent is hereby corrected as shown below:

In the Claims

Column 11, line 43, Claim 8, between the words "velocity" and "which", please insert the word --by--

Signed and Sealed this
Eighteenth Day of November, 2014

Michelle K. Lee
*Deputy Director of the United States Patent and Trademark Office*